Patented May 1, 1934

1,956,908

UNITED STATES PATENT OFFICE 1,956,908

AGENT FOR KEEPING CUT FLOWERS AND THE LIKE FRESH

Oskar Neubert, Leverkusen-I. G.-Werk, Germany, assignor to Winthrop Chemical Company, Inc., New York, N. Y., a corporation of New York No Drawing. Application June 16, 1933, Serial No. 676,207. In Germany July 20, 1932

7 Claims. (Cl. 47—1)

It is well known that cut flowers and other parts of plants can be kept fresh by adding to the water in which they are kept a nutrient and a stimulating and bactericide metal salt. As nutrients for the said purpose have been suggested potassium, ammonium and magnesium sulfates, phosphates and chlorides and organic nutrients like sugars of any kind, as for example, levulose, glucose or any other water soluble sugar, as well as lactic acid, asparagine, dihydroxyacetone and the like. As stimulating and bactericide metal salts water-soluble salts of silver and copper have been suggested. The employment of said combinations of the substances is however attended by the drawback that the small quantities of stimulating and bactericide substances are only difficultly homogeneously mixed with the nutrients and easily separate again on shaking the mixtures.

I have now found that agents particularly valuable for the aforesaid purpose can be obtained by homogeneously coating the surface of particles of from about 1 to about 2 mms. diameter of a water-soluble, solid plant nutrient with a stimulating and bactericide, water-soluble metal salt.

In the following I shall explain the best method for carrying out the process according to my invention with reference to the employment of cane sugar as the nutrient material.

A batch of one or more granulated plant nutrients chosen is mixed with a small quantity, say of from about 0.1 to about 2 per cent by weight of the nutrients of a stimulating and bactericide water soluble metal salt and, while vigorously working the mixture, a small quantity of water or other suitable solvent for the metal salt is sprayed on the mixture. In most cases water will be preferred as the solvent but also mixtures thereof with water-soluble organic solvents, as for example, alcohols, may be employed. A solution of the metal salt is thus formed and is evenly distributed on the surface of the grains of nutrient. In order to obtain a product which can be easily dispensed and spread from packages in measured quantities, the water or other solvent is removed by drying, any coarse lumps formed being then broken or ground to about the original size of the grains of nutrient.

For carrying out a specific modification of the process in question, crystals of cane sugar of a diameter of from about 1 to about 2 mms. are homogeneously mixed with a small quantity of finely powdered cane sugar and a very small quantity of a powdered stimulating and bactericide metal salt, as for example, silver nitrate or silver sulfate, whereupon a very small quantity of water, insufficient for dissolving any substantial portions of the sugar crystals, is sprayed with the aid of a spraying-pistol on the mixture, while vigorously stirring the latter, so that all the crystals are slightly and uniformly moistened.

Instead of adding the metal salt to the sugar the metal salt may be dissolved in the water employed for moistening the sugar. By drying the resulting product at from about 30 to about 60° C. and disintegrating the resulting slightly coherent mass of crystals, a product is obtained in which practically all crystals are coated with a thin layer of the metal salt. When employing a water-soluble silver salt, a slight reduction of the latter may take place so that the coating on the crystals may contain some colloidal silver together with the silver salt. If the water employed for spraying should contain some salts of hydrogen halides, a small quantity of silver halides may be deposited on the crystals. In any case the silver compounds or mixtures thereof with colloidal silver are homogeneously dispersed on the crystals and strongly adhere thereto, so that samples taken from any portion of the batch will always contain practically the same content of silver.

In the place of water soluble silver salts other water-soluble metal salts may be employed which possess a stimulating and bactericide effect, as for example copper salts. If desired, the sugar may be replaced by any other solid water-soluble plant nutrient, as for example by one or more of the nutrients described above.

The powdered sugar employed in the beforementioned process acts as an adhesive for facilitating the fastening of the metal salts on the sugar crystals. In the place of the powdered sugar, any other water-soluble adhesive may be employed, as for example water-soluble starch, water-soluble derivatives of carbohydrates or other organic adhesives of mineral or animal origin, as for example animal or vegetable glues or gelatine. If the metal salt is applied by spraying an aqueous solution thereof the employment of an adhesive may be dispensed with.

In most cases a quantity of metal salt of from about 0.15 to about 0.3 per cent by weight of the nutrient will be sufficient, especially in the case of employing silver nitrate as the stimulating and bactericide metal salt. The quantity of water is chosen according to the solubility in water of the plant nutrient, care being taken that a substantial dissolution of the grains of plant nutrient is avoided during the process of moistening the nutrient and that the single grains are only superficially moistened or softened. In the case of employing crystals of cane sugar of from about 1 to about 2 mms. size, the quantity of water should not exceed 10 per cent by weight of the crystals and may be as low as 1 per cent.

The products obtainable according to the present invention show the advantage over the mixture hitherto known in that no separation of nutrient and metal salt occurs, even on extended shaking of the product, and that the products are still uniform after long transports and show a uniform efficacy.

The following example will further illustrate how the present invention may be carried out in practice, but the invention is not restricted to this example.

*Example.*—43 kgs. of coarse crystalline cane sugar the particles of which have a diameter of about 2 mms. are homogeneously stirred in an enameled vessel with a mixture of 2 kgs. of finely powdered cane sugar and 0.3 kgs. of finely ground silver nitrate. While continuing stirring, about 0.25 kg. of water is sprayed in the form of a mist on the mixture with the aid of a spraying-pistol, so that the whole mass is uniformly but slightly moistened. The resulting moist mass is then spread on suitable metal dishes and dried in a drying cupboard at about 50° C. For accelerating the drying operation, any crystal cakes formed may be disintegrated during the drying operation. After about 5 hours' drying a product is obtained in which the single sugar crystals are homogeneously coated with silver nitrate and may show a slight silvery lustre after some storing in the air.

I claim:

1. The process for the production of agents suitable for keeping cut flowers fresh which comprises intimately working particles of a water-soluble, solid plant nutrient of from about 1 to about 2 mms. diameter with a small quantity of a stimulating and bactericide water-soluble metal salt, in the presence of a quantity of a solvent for said nutrient and said metal salt at the most capable of superficially dissolving the said particles of plant nutrient.

2. The process for the production of agents suitable for keeping cut flowers fresh which comprises intimately working particles of a sugar of from about 1 to about 2 mms. diameter with from about 0.1 to about 2 per cent by weight of the sugar of a stimulating and bactericide, water-soluble salt in the presence of a quantity of water at the most capable of superficially dissolving the said particles of sugar.

3. The process for the production of agents suitable for keeping cut flowers fresh which comprises intimately working grains of cane sugar of from about 1 to about 2 mms. diameter with from about 0.1 to about 0.3 per cent by weight of the sugar of silver nitrate and a small quantity of powdered cane sugar, while spraying a mist of water on the mixture, the quantity of water being at the most capable of superficially dissolving the said grains.

4. Agents for keeping cut flowers and the like fresh comprising grains of a water-soluble, solid plant nutrient of from about 1 to about 2 mms. diameter coated with a thin layer comprising a water-soluble, stimulating and bactericide metal salt.

5. Agents for keeping cut flowers and the like fresh comprising grains of sugar of from about 1 to about 2 mms. diameter coated with a thin layer comprising a water-soluble, stimulating and bactericide metal salt.

6. Agents for keeping cut flowers and the like fresh comprising grains of sugar of from about 1 to about 2 mms. diameter coated with a thin layer comprising silver nitrate.

7. Agents for keeping cut flowers and the like fresh comprising grains of sugar of from about 1 to about 2 mms. diameter coated with a thin layer comprising silver nitrate and colloidal silver.

OSKAR NEUBERT.